United States Patent Office 3,320,200
Patented May 16, 1967

3,320,200
POLYVINYL ALCOHOL ADHESIVES CONTAINING BORIC ACID AND HEXAMETHYLENETETRAMINE OR TRIETHYLENEDIAMINE AS ADDITIVE TO IMPART QUICK TACK
Thomas G. Kane, Wilmington, Del., assignor to E. I. du Pont de Nemours and Company, Wilmington, Del., a corporation of Delaware
No Drawing. Filed Mar. 1, 1965, Ser. No. 436,276
6 Claims. (Cl. 260—29.6)

This invention relates to polyvinyl alcohol adhesives. More particularly, it relates to polyvinyl adcohol adhesives containing certain additives which impart a highly desirable quick tack property.

Polyvinyl alcohol adhesives are of course well known. It is also well known that in unmodified form, e.g., simple aqueous solutions of polyvinyl alcohol, polyvinyl alcohol adhesives lack or are deficient in wet tack which is highly desirable if not essential for many uses.

Modified polyvinyl alcohol adhesives having improved wet tack resulting from the addition of 4 to 15% based upon the weight of polyvinyl alcohol, of a water-soluble boron compound and an amount of a water-soluble acid such that the pH of the adhesive is below pH 5.5, are disclosed in Hawkins U.S. Patent 3,135,648. Use of the stated amount of the boron compound is indicated to be essential to the obtainment of satisfactory wet tack, and control of the pH to a value below 5.5 is indicated to be critical.

While the Hawkins' type adhesive is suitable for some purposes, it is not suitable for others in that it does not possess adequate "quick tack" or "green strength," which is the property or capability of effecting substantially instantaneous bonding of substrate surfaces together. This property is essential in adhesive to be used in the machine property is essential in adhesives to be used in the machine manufacture of corrugated fiberboard, particularly at single-facer stations where machine speeds of 300 to 600 ft./min. are encountered. At such machine speeds, adhesive bond formation between the corrugating medium and the paper liner at the single-facer station must be substantially instantaneous, i.e., on the order of 2 to 4 thousandths of a second. The Hawkins' type adhesive has not proved to be effective in uses of the above type.

The adhesives currently used in corrugating are starch-based adhesives formed by suspending a water-insoluble starch in a dilute starch solution. They possess the low viscosity required for rapid machine application and the required quick tack is developed as the result of gelling the starch particle the moment contact is made with the hot corrugating roll. However, since the various polyvinyl alcohol resins do not develop quick tack under similar conditions, a polyvinyl alcohol adhesive, to be usable, must be one which initially possesses the required quick tack, yet is not so viscous as to preclude effective machine application.

It is an object of the invention to provide polyvinyl alcohol adhesives possessing improved properties. A particular object is to provide such adhesives which possess an initial quick tack and are eminently suitable for use in high speed corrugating machines, particularly at the single-facer stations for making corrugating fiberboard. A still further object is to provide polyvinyl alcohol- and clay-based adhesives of the above type. Yet another object is to provide dry mixtures of polyvinyl alcohol and modifying agents, which mixtures may be added to or compounded with water to produce the above type adhesives.

Still further objects of the invention will be apparent from the following description.

The present invention is based upon the discovery that the highly desired quick tack property can be readily imparted to polyvinyl alcohol adhesives by adding thereto boric acid and also hexamethylenetetramine (HMTA) or triethylenediamine (TEDA) in certain proportions. It has been found that HMTA and/or TEDA function to increase substantially the tackifying action of boric acid upon polyvinyl alcohol adhesives, thus permitting the obtainment of a given tackiness with the use of substantially less boric acid than would otherwise be required, or to obtain substantially greater tackiness than could be obtained with the same amount of boric acid alone. It has been discovered further that dry mixtures of polyvinyl alcohol, boric acid and HMTA or TEDA can be readily formulated, which mixtures can be simply dissolved in the proper amount of water, in the presence or absence of a filler such as clay, to form the finished improved adhesive at the point of ultimate use. The clay may also be included, if desired, in the dry mixture of the other components. Use of such dry mixtures, with or without clay, simplifies formation of the final adhesive by the adhesive user and avoids the shipping of the water component of the final adhesive. Of course, the adhesive can be made by the adhesive user by mixing all of the essential and desired components in proper proportions.

Whether the indicated preformed dry mixes are used, or whether all components, including water, are mixed together initially, formulation of the final adhesive will involve dissolving in the water component the other essential components, i.e., polyvinyl alcohol, boric acid and HMTA or TEDA. The dissolving of the essential components in water can be effected readily by heating an agitated mixture thereof in the appropriate amount of water until they are dissolved. Temperatures of around 160 to 210° F. are effective. A very practical way is to heat the agitated mixture by passing live steam thereinto until a temperature of about 170° F. is reached and then continuing the introduction of steam to maintain the temperature at 170 to 180° F. for an additional half hour, after which the resulting adhesive is permitted to cool.

Instead of preparing the adhesive from a dry mix of the essential components, such components can be dissolved separately in the water to be used, or one or more of the components can be dissolved in separate portions of the water and the resulting solutions then mixed. If a filler such as clay is to be included, it can be blended with such intermediate solution of any of the essential components, or it can be added after all other components have been mixed with the water.

As is well known, polyvinyl alcohol is prepared by the alcoholysis, saponification or hydrolysis of a polyvinyl ester such as polyvinyl acetate, so as to convert at least about 70% of the ester groups of the latter to hydroxyl groups. The extent to which such conversion is effected is commonly referred to as the degree of hydrolysis, which is frequently expressed as percent hydrolysis. A polyvinyl alcohol that is 99 to 100% hydrolyzed, i.e., 99 to 100% of the ester groups are converted to hydroxyl groups, is generally referred to as a completely hydrolyzed polyvinyl alcohol, while one that is hydrolyzed to a lesser extent is referred to as a partially hydrolyzed polyvinyl alcohol. Polyvinyl alcohols of various degrees of hydrolysis are available commercially in high, medium and low viscosity grades. The viscosity of a polyvinyl alcohol depends upon the degree of polymerization of the polyvinyl ester from which it was derived (the higher the degree of polymerization of the parent ester, the higher will be the viscosity of the polyvinyl alcohol).

Any of the commercially available polyvinyl alcohols, i.e., the high, low and medium viscosity grades of completely hydrolyzed and partially hydrolyzed polyvinyl alcohols, can be employed in practicing the present invention, since the tack property of adhesives prepared employing any such grades is improved significantly by the addition thereto in accordance with the invention of the modifying agents discussed below. In general, the polyvinyl alcohol will have a viscosity of 3 to 150 centipoises, as measured for a 4% solution in water at 20° C., using the conventional Hoeppler falling ball method. However, the polyvinyl alcohols that are preferred, particularly for preparing adhesives for use in a high speed corrugating machine, are the completely hydrolyzed (99 to 100%), medium viscosity grades, the viscosities of which range from about 15 to 60 centipoises.

The adhesives of the invention comprise aqueous solutions containing about 4 to 20% polyvinyl alcohol, based upon the combined weights of the water and polyvinyl alcohol components. Polyvinyl alcohol concentrations of at least about 4% are generally required to develop the desired adhesive properties while concentrations higher than about 20% generally yield solutions which are too viscous for practical use. The preferred adhesives will contain 5 to 12% polyvinyl alcohol, on the basis indicated above.

The improved modifying agents for preparing the adhesives of the invention are combinations of (1) boric acid and (2) hexamethylenetetramine (HMTA), or triethylenediamine (TEDA), or a mixture of HMTA and TEDA. The boric acid should be employed in an amount equal to 1 to 7%, preferably 2 to 6%, based upon the weight of the polyvinyl alcohol. Amounts less than 1% are generally insufficient to develop significant improvement in the tackiness of the adhesives, while amounts greater than about 7% generally cause undesired gel formation, although the absolute permissible maximum in any given instance will depend somewhat upon the particular polyvinyl alcohol employed and its concentration in the adhesive.

The HMTA, TEDA, or mixtures thereof, should be employed in an amount equal to 0.7 to 12%, preferably 3 to 7%, based upon the weight of the boric acid used. The function of these agents is to improve the tackifying action of the boric acid. Amounts thereof less than about 0.7% of the boric acid are generally insufficient to impart significant improvement in this respect, while amounts greater than about 12% generally increase the viscosity of the adhesive excessively or result in gelation of the polyvinyl alcohol.

The most preferred adhesives of the invention will also include a filler such as clay, although clay is not to be regarded as an essential component. However, the inclusion of clay is desirable for many uses, particularly where rapid or instantaneous adhesion is desired, as in the single-facer of a corrugating machine, and where inhibition of penetration into the substrate is desired. The addition of relatively cheap clay is also desirable, for economic reasons. When used, the clay will generally be added in amounts of from 20 to 700%, based upon the weight of polyvinyl alcohol. The preferred amounts generally range from 200 to 400%. Clays of the kaolinite type are generally preferred. Commercially available clays of this type include ASP 100 and ASP 200, which are finely divided grades; ASP 400, a relatively coarse grade; and ASP 600, which is a medium particle size grade. Such clays are commonly used as fillers in polyvinyl alcohol adhesives.

A "quick tack" test has been developed for evaluating adhesive performance and for screening adhesives as to their usefulness in commercial corrugating machine operations. The test involves determining the force, expressed in grams/cm.$^2$, required to separate two sheets of paper which have been bonded together by a thin film of the adhesive.

The determination is carried out in the following way: A sheet of corrugating liner (42–90 lb. kraft) is attached by means of a double-faced masking tape to one side of a sheet of aluminum (8" x 4" x 3/16") whose opposite side has fixed thereto at right angles a 1/4" aluminum rod or handle. The resulting assembly of the corrugating liner, aluminum sheet and handle constitute a "stamp." A sheet of corrugating medium (33–36 lb. kraft) is attached by means of a double-faced masking tape to a second aluminum sheet (8" x 4"), and a thin film (1.5 mil, wet) of the adhesive is then rapidly deposited on the exposed face of the corrugating medium by means of a Mayer rod or other "doctoring" device. The "stamp" is then immediately brought into contact with the adhesive coated medium and the total assembly is then immediately raised by means of the handle of the stamp to a height of 12 inches, where it must remain intact and without separation resulting between the adhesive bonded surfaces for at least 3 seconds. By varying the weight of the second or the supported aluminum sheet, the test can be repeated until the maximum weight supported by the adhesive bond for at least 3 seconds is determined, from which the adhesive bonding strength can be calculated in terms of grams/cm.$^2$.

Such bonding strengths will generally vary from 2.7 grams/cm.$^2$ to 10.1 grams/cm.$^2$. Several determinations are generally made and the average of them all is then taken as the "Quick Tack Test" value (QTT value).

For comparison purposes, it is convenient to assign ratings to such QTT values. This is done, for present purposes, by assigning a rating of 25 to a QTT value of 2.7 grams/cm.$^2$, and a value of 100 to a QTT value of 10.1 grams/cm.$^2$. If a linear rating scale is established showing ratings of 25 and 100, respectively, for the above QTT values, the rating for any QTT value between 2.7 and 10.1 grams/cm.$^2$ can be read directly from the scale. Thus, a QTT value of 6.4 would correspond to a rating of 62.5 on the scale (i.e., a rating midway between 25 and 100). Such "Quick Tack" ratings (QT ratings) are included in the results reported in various of the examples below.

The invention is illustrated by the following examples. In the examples and elsewhere herein, all parts and percentages are by weight unless indicated to be otherwise.

EXAMPLE 1

A dry blend of the following was prepared:

| | Parts |
|---|---|
| Polyvinyl alcohol | 17.5 |
| Tapioca starch | 6.0 |
| Boric acid | 1.0 |
| Hexamethylenetetramine | 0.06 |
| Dimethylphthalate | 1.7 |

The polyvinyl alcohol used was a completely hydrolyzed grade having a viscosity of 30 cps. (4% solution). The dry blend was added to 179 parts of water at about 70° F. under brisk agitation, and then 75.5 parts of ASP–200 clay were added. After a smooth slurry had been formed, live steam was passed into the slurry for about 30 minutes. During this time, the slurry went through a very viscous stage at about 150° F. but it became quite fluid when the temperature reached about 170° F. Passage of steam into the mixture was continued for another half hour to maintain the temperature at 170 to 180° F., following which steaming was discontinued and the adhesive paste was permitted to cool to 140° F., at which temperature its viscosity was 4800 cps. (Brookfield, #6 Spindle, 20 r.p.m.). The final adhesive had a solids content of 29–30% and a QT rating of about 86.

The above adhesive was employed on a Langston (93")

single-facer corrugating machine operating at 300 ft./min, to bond a 42 lb. kraft liner to a 33 lb. (kraft) corrugating medium. Pin adhesion, short column crush, puncture, burst and flat crush tests on the corrugate product indicated that it was as good as corresponding product made with the standard starch-based adhesive.

EXAMPLE 2

A dry blend of the following was prepared:

| | Parts |
|---|---|
| Polyvinyl alcohol | 30 |
| Tapioca starch | 10 |
| Boric acid | 0.9 |
| Hexamethylenetetramine | 0.045 |
| Non-ionic surfactant (alkylphenol-ethylene oxide condensate type) | 0.005 |
| Dimethylphthalate | 3.0 |

The polyvinyl alcohol was of the same grade as that used in Example 1. The procedure of Example 1 was followed generally in preparing the adhesive from the above dry blend, 100 parts of ASP-200 clay and sufficient water to give a solids content of 30.3%. The adhesive had a QT rating of 87, a pH of 5.2 and a viscosity at 100° F. of 4570 cps. (Brookfield, #6 Spindle, 100 r.p.m.).

An adhesive of the above composition was employed in making a corrugate using a Langston corrugating machine having three single-facer adhesive stations and three double-backer adhesive stations. It gave results comparable to those obtained when using starch based adhesive.

EXAMPLE 3

Two adhesives were prepared by the general method of Example 1, employing polyvinyl alcohol of the same grade as that employed in that example. The materials used to formulate the adhesives were as follows:

| | Adhesive | |
|---|---|---|
| | A | B |
| Polyvinyl alcohol, parts | 16.5 | 17.5 |
| ASP-200 clay, parts | 83.5 | 75.5 |
| Boric acid, parts | 0.8 | 1.0 |
| Hexamethylenetetramine, parts | 0.05 | 0.06 |
| Dimethylphthalate, parts | 1.63 | |
| Water to give solids contents of, percent | 33 | 26 |

Adhesives A and B had viscosities at 100° F. (Brookfield, #4 Spindle, 60 r.p.m.), respectively, of 1300 and 900 cps. Both adhesives possessed good quick tack properties.

The above adhesives performed satisfactorily when used to prepare single-faced corrugate from a 26 lb. kraft corrugate medium and a 42 lb. kraft liner on a Langston single-facer corrugating machine operated 200 and 300 ft./min. Both adhesives performed well, whether the liner was run hot (about 240–270° F.) or cold (about 110–130° F.).

EXAMPLE 4

An adhesive was prepared essentially as described in Example 1 using the same grade of polyvinyl alcohol. It contained:

| | Parts |
|---|---|
| Polyvinyl alcohol | 17.5 |
| ASP-200 clay | 75.5 |
| Tapioca starch | 6.0 |
| Boric acid | 1.0 |
| Hexamethylenetetramine | 0.06 |
| Dimethylphthalate | 1.7 |
| Water to give a solids content of about 30.0% | |

The adhesive had a pH of 5.8, a viscosity at 140° F. of 4800 cps. (Brookfield, #6 Spindle, 50 r.p.m.). It performed well when used to prepare single-faced corrugate from a 33 lb. kraft corrugate medium and a 42 lb. kraft liner on a 93" Langston corrugating machine operated at 300 ft./min.

EXAMPLE 5

The general procedure of Example 1 and the grade of polyvinyl alcohol employed therein, were used to prepare six adhesives (A through F), each of which was formulated using 14.3 parts of polyvinyl alcohol, 51.5 parts of ASP-200 clay, 0.7 part boric acid and about 153 parts of water. Thus, for each adhesive, the polyvinyl alcohol (PVA) content, based upon PVA plus water, was 8.5%; the boric acid content, based upon PVA, was 5%; the clay content, based upon the PVA, was 357%, and the total solids content was about 30%.

Adhesive A contained only the materials indicated above, whereas hexamethylenetetramine (HMTA) was added in the amounts of 0.007, 0.021, 0.035, 0.049 and 0.07 part, respectively, in formulating adhesives B through F. The HMTA contents of the adhesives and various properties thereof are tabulated below. The viscosities are Brookfield, #6 Spindle.

| | Adhesive | | | | | |
|---|---|---|---|---|---|---|
| | A | B | C | D | E | F |
| HMT, based on boric acid, percent | 0 | 1 | 3 | 5 | 7 | 10 |
| pH | 4.5 | 4.8 | 5.1 | 5.4 | 5.7 | 6.0 |
| Viscosity at 100° F., cps.— | | | | | | |
| At 10 r.p.m | 1,700 | 1,800 | 2,000 | 2,700 | 2,700 | 4,200 |
| At 1,000 r.p.m | 1,400 | 1,550 | 1,700 | 2,050 | 2,350 | 3,550 |
| QT rating | 48 | 72 | 86 | 72 | 86 | 100 |

It will be seen from a comparison of the above data for adhesives A and B that the addition of as little as 1% HMTA (based on boric acid) increased significantly the QT rating. In general, the QT rating, the pH and the viscosity become increasingly higher with increasing amounts of HMTA. It is significant, as shown by the above data, that by using HMTA along with the boric acid, adhesives having good quick tack can be readily obtained even at a pH substantially higher than pH 5.5, which had been heretofore regarded as the maximum usable pH in adhesives of this type containing boric acid.

Adhesives A through F above are actually thrixotropic as is generally indicated when the ratio of viscosity at 10 r.p.m: viscosity at 100 r.p.m. exceeds 1, as is the case for adhesives A through F.

EXAMPLE 6

An adhesive similar to those of Example 5, was prepared using 14.3 parts of the polyvinyl alcohol, 51.5 parts of the clay, 0.44 part boric acid, 0.044 part of triethylenediamine (TEDA) and about 153 parts of water. The adhesive had a PVA content, based on PVA plus water, of 8.5%; a boric acid content, based on PVA, of 3%; a TEDA content, based on boric acid, of 10%; and a clay content of 357%, based on the PVA. Its solids content was about 30%, its pH was 5.7 and its Brookfield viscosities at 100° F., (#6 Spindle) at 10 and 100 r.p.m., respectively, were 4500 and 3580 cps. The QT rating for this adhesive was 58.

The above example shows that fairly good quick tack can be obtained with relatively low amounts of boric acid when used in combination with TEDA.

EXAMPLE 7

Two adhesives (A and B) were prepared by the general procedure of the foregoing examples, employing in the formulation of each, 20 parts of the polyvinyl alcohol, 100 parts of the clay, 0.6 part of boric acid and 223 parts of water. The adhesives contained 8.2% PVA, 5% boric acid and 500% clay, on the bases indicated previously, and both had solid contents of about 35%. Adhesive B additionally contained 0.03 part of HMTA, equal to 3% of the boric acid present. It had a pH of 5.1, a QT rating of 72 and Brookfield viscosities (#6 Spindle) at 100° F. and 10 and 100 r.p.m., respectively, of 5500 and 3200 cps. Adhesive A, which contained no HMTA, had a pH of 4.8, a QT rating of 58 and corresponding viscosities of 3500 and 2050 cps.

The results of the above example show that substantial improvement in quick tack can be obtained by employing HMTA along with the boric acid, even in polyvinyl alcohol adhesives having a high clay content.

EXAMPLE 8

A dry blend of the following was prepared:

| | Parts |
|---|---|
| Polyvinyl alcohol | 23 |
| Corn starch | 20 |
| ASP-600 clay | 57 |
| Boric acid | 1.2 |
| Hexamethylenetetramine | 0.075 |

The polyvinyl alcohol used was a completely hydrolyzed grade having a viscosity of 60 cps. (4% solution). The dry blend was formulated into an adhesive containing about 22% solids, following the general procedure of Example 1. The boric acid content was 5% based on the polyvinyl alcohol, and the hexamethylenetetramine content was 6.25% based on the boric acid. The pH was about 6.

The above adhesive was used to laminate various types of kraft liners to themselves and to bituminized boxboard fillers. The adhesive gave fiber-tearing bonds in less than 5 seconds in the case of the kraft liners, and in 45 seconds in the case of the bituminized fillers. The bonds of the resulting laminates were still fiber tearing even after soaking in water at room temperature for 72 hours.

EXAMPLE 9

An adhesive (A) was prepared following the general procedure of Example 1 employing 25 parts of polyvinyl alcohol (a completely hydrolyzed grade having a viscosity of 60 cps. for a 4% solution), 25 parts of tapioca starch, 1.25 parts of boric acid, 0.075 part of hexamethylenetetramine and 450 parts of water. The adhesive had a pH of 6.0 and a solids content of about 10%. Another adhesive (B) was prepared from the same materials in the same proportions, except that no hexamethylenetetramine was used. It had a pH of 5.7.

The Brookfield viscosities (#6 Spindle) for the above adhesives were as follows:

| | Adhesive A, r.p.m. | | Adhesive B, r.p.m. | |
|---|---|---|---|---|
| | 6 | 60 | 6 | 60 |
| Viscosity (cps.) at 140° F | 1,900 | 1,660 | 1,000 | 750 |
| Viscosity (cps.) at 110° F | 7,200 | 3,650 | 3,200 | 1,980 |
| Viscosity (cps.) at 80° F | 11,000 | 5,750 | 6,300 | 3,520 |

Adhesives A and B were used under similar conditions to prepare kraft liner laminates. Adhesive A gave laminate bonds which started showing fiber tearing in only 10 seconds and became completely fiber tearing in only 15 seconds. In contrast, adhesive B (containing no hexamethylenetetramine) gave bonds which did not begin to show fiber tearing until after 20 seconds and did not become completely fiber tearing until after 35 seconds.

As has been indicated above, the improved polyvinyl alcohol adhesives of the invention result from the use of HMTA and/or TEDA along with the boric acid. The amounts of these modifying agents to be employed have been indicated generally above. When the adhesive also includes clay and is intended for use in a corrugating machine, the modifying agents employed should be sufficient to produce an adhesive having a QT rating of at least 60, e.g., 60 to 100, and preferably at least 70, e.g., 70 to 80. However, for low speed operations or for other uses, adhesives with lower QT ratings may be suitable. The amount of HMTA should not be so great as to increase the pH to above about 6.2 or the viscosity to above about 6000 cps. (Brookfield, #6 Spindle, 100° F., 100 r.p.m.). The preferred ranges for pH and viscosities, respectively are, pH 5.0 to 6.0, and 200 to 5000 cps. Generally, pH values lower than about 4 and viscosities lower than about 500 do not result in good adhesives.

The presence of HMTA or TEDA increases the tackifying effectiveness of the boric acid whether or not the adhesive is clay-filled. The boric acid can, and preferably will be, added as such, although it can also be formed in situ in the adhesive by the reaction of a borate salt such as borax with an acid such as phosphoric acid or citric acid.

The embodiments of the invention in which an exclusive property or privilege is claimed are as follows:

1. A dry mixture adapted to form an adhesive, said mixture comprising polyvinyl alcohol, 1 to 7% boric acid based upon the weight of said polyvinyl alcohol, and, based upon said boric acid, 0.7 to 12% of a compound of the group consisting of hexamethylenetetramine, triethylenediamine and mixtures thereof.

2. A dry mixture adapted to form an adhesive, said mixture comprising polyvinyl alcohol, 2 to 6% boric acid based upon the weight of said polyvinyl alcohol, and, based upon the weight of said boric acid, 3 to 7% of a compound of the group consisting of hexamethylenetetramine, triethylenediamine and mixtures thereof.

3. A polyvinyl alcohol adhesive comprising an aqueous polyvinyl alcohol solution containing 4 to 20% polyvinyl alcohol by weight, said solution also containing 1 to 7% boric acid, based upon the weight of said polyvinyl alcohol, and, based upon the weight of said boric acid, from 0.7 to 12% of a compound of the group consisting of hexamethylenetetramine, triethylenediamine and mixtures thereof.

4. An adhesive in accordance with claim 3 which includes a clay filler in an amount equal to 20 to 700% of the weight of the polyvinyl alcohol.

5. A polyvinyl alcohol adhesive comprising an aqueous polyvinyl alcohol solution containing 5 to 12% polyvinyl alcohol by weight, said solution also containing 2 to 6% boric acid, based upon the weight of said polyvinyl alcohol, and 3 to 7% hexamethylenetetramine, based upon the weight of said boric acid.

6. An adhesive in accordance with claim 5 which includes a clay filler in an amount equal to from 200 to 400% of the weight of the polyvinyl alcohol.

References Cited by the Examiner

UNITED STATES PATENTS

| | | | |
|---|---|---|---|
| 2,439,108 | 4/1948 | Staehle | 260—29.6 |
| 2,487,448 | 11/1949 | Kingerley | 260—17.4 |
| 3,135,648 | 6/1964 | Hawkins | 260—29.6 |
| 3,197,429 | 7/1965 | Boatz | 260—29.6 |
| 3,213,051 | 10/1965 | Pink | 260—29.6 |

MURRAY TILLMAN, *Primary Examiner.*

W. J. BRIGGS, SR., *Assistant Examiner.*